United States Patent
Roscoe et al.

(10) Patent No.: US 7,200,865 B1
(45) Date of Patent: Apr. 3, 2007

(54) METHOD AND SYSTEM FOR COMMUNICATION CONTROL IN A COMPUTING ENVIRONMENT

(75) Inventors: Timothy Roscoe, San Francisco, CA (US); Joseph B. Lyles, Mountain View, CA (US); Rebecca Isaacs, Cambridge (GB)

(73) Assignee: Sprint Communications Company L.P., Overland Park, KS (US)

( * ) Notice: Subject to any disclaimer, the term of this patent is extended or adjusted under 35 U.S.C. 154(b) by 918 days.

(21) Appl. No.: 09/941,326

(22) Filed: Aug. 29, 2001

Related U.S. Application Data

(63) Continuation-in-part of application No. 09/728,558, filed on Dec. 1, 2000, now abandoned.

(51) Int. Cl.
  *G06F 9/00* (2006.01)
  *G06F 12/16* (2006.01)
(52) U.S. Cl. .......................................... 726/12; 726/13
(58) Field of Classification Search ................ 713/200; 726/12, 13; 709/232
  See application file for complete search history.

(56) References Cited

U.S. PATENT DOCUMENTS

| | | | |
|---|---|---|---|
| 5,987,611 A * | 11/1999 | Freund ........................... | 726/4 |
| 6,006,264 A | 12/1999 | Colby et al. | |
| 6,141,755 A * | 10/2000 | Dowd et al. .................... | 726/11 |
| 6,430,561 B1 * | 8/2002 | Austel et al. ................... | 707/9 |
| 6,484,261 B1 * | 11/2002 | Wiegel ........................ | 713/201 |

OTHER PUBLICATIONS

Pfleeger (Charles P. Pfleeger, "Security in computing", 2nd edition, 1996, ISBN: 0133374866).*

Stallings (William Stallings, "Data and computer communications", 5th edition, 1997, ISBN: 0024154253), p. 20-21.*

Pfleeger (Charles P. Pfleeger, "Security in computing", 2nd edition, 1996, ISBN: 0133374866) p. 429-430.*

TCSEC (Department of Defense, "Trusted Computer System Evaluation Criteria", Dec. 1985).*

Enterasys Networks—SmartSwitch Router 8600, http://www.enterasys.com/products/items/SSR-16/, printed from the World Wide Web on Nov. 19, 2000.

ArrowPoint Web Network Services—Enabling the Web-Centric Internet, http://www.arrowpoint.com/solutions/white_papers/printer/WebNS.html, printed from the World Wide Web on Nov. 19, 2000.

(Continued)

*Primary Examiner*—Gilberto Barrón, Jr.
*Assistant Examiner*—Peter Poltorak

(57) ABSTRACT

An access control system for a computing environment in which a number of processing nodes are interconnected to one another via an interconnection system. Multiple program applications, each made up of a number of application components, are installed in the environment, such that their components may be distributed among the various processing nodes of the platform. A set of rules is established, indicating allowed inter-node communications between the application components, and those rules are mapped onto a set of logic in the platform. The logic may be embodied in various forms, such as packet-filtering logic in a network interconnect switch, or firewall logic in a processing node. In turn, when an application component on one node attempts to communication with another application component on another node, a determination can be made whether the communication is allowed and, if the communication is not allowed, the communication can be blocked.

40 Claims, 2 Drawing Sheets

OTHER PUBLICATIONS

Industry Solutions—Taking Clustering to the Next Level, printed from the World Wide Web on Nov. 21, 2000.

LSF Documentation—Migration from Task Broker, Platform Computing, printed from the World Wide Web on Nov. 30, 2000.

Industry Solutions—Optimizing Your Compute Farm with LSF, printed from the World Wide Web on Nov. 21, 2000.

Casemore et al., Workload Management in the Distributed Enterprise, Platform Computing Corporation, Sep. 27, 1999.

Chen, Mike et al., "Popeye—Using Fine-grained Network Access Control to Support Mobile Users and Protect Intranet Hosts," pp. 1-8, dated Dec. 11, 2000.

Solsoft, Policy Management for e-Business / Security, Now you can Visually Define, Deploy & Manage Security Policies with Solsoft NP, Apr. 2000.

Solsoft NP 4.1, Policy Management for e-Business / Security, Nov. 2000.

Network security management, policy-based security, IP filtering by Solsoft, http://www.solsoft.com/index.html, printed from the World Wide Web on Apr. 16, 2001.

Sofsoft [Product News], http://www.solsoft.com/products/product_news.html, printed from the World Wide Web on Apr. 16, 2001.

Solsoft [Overview], http://www.solsoft.com/corporate/overview.html, printed from the World Wide Web on Apr. 16, 2001.

Solsoft NP / Security Customer Quotes, May 2000.

Solsoft [Intranet Security Policy], http://www.solsoft.com/products/applications/intranet.html, printed from the World Wide Web on Apr. 16, 2001.

Solsoft [Net Partitioner], http://www.solsoft.com/products/index.html, printed from the World Wide Web on Apr. 16, 2001.

Solsoft [Specifications], http://www.solsoft.com/products/specifications.html, printed from the World Wide Web on Apr. 16, 2001.

Solsoft [Applications], http://www.solsoft.com/products/applications.html, printed from the World Wide Web on Apr. 16, 2001.

Solsoft [e-Commerce Security Policy], http://www.solsoft.com/products/applications/ecommerce.html, printed from the World Wide Web on Apr. 16, 2001.

Solsoft [Intranet Security Policy], http://www.solsoft.com/products/applications/extranet.html, printed from the World Wide Web on Apr. 16, 2001.

Solsoft [Branch Office Security Policy], http://www.solsoft.com/products/applications/brachoffice.html, printed from the World Wide Web on Apr. 16, 2001.

Caronni et al., Virtual Enterprise Networks: The Next Generation of Secure Enterprise Networking, printed from the World Wide Web at least as early as Dec. 1, 2000.

* cited by examiner

METHOD AND SYSTEM FOR COMMUNICATION CONTROL IN A COMPUTING ENVIRONMENT

REFERENCE TO RELATED APPLICATION

The inventors claim priority to U.S. patent application Ser. No. 09/728,558, filed Dec. 1, 2000.

BACKGROUND

1. Field of the Invention

The present invention relates to computing environments and, more particularly, to methods and systems for structuring and implementing access control in a computing environment.

2. Description of Related Art

The science of computing has undergone rapid changes in recent years. In the past, computer applications were largely restricted to execution on a single machine, comprising a single processor. Often, the machine on which the application is executed would take the form of a server, accessible over a network by client machines. With the recent growth of the Internet, network-based computing has become more and more commonplace.

Within the past decade, the computing and networking industry has begun to embrace the concept of a cluster-based computing environment. In a cluster-based computing environment, a number of computers may be clustered together (e.g., physically proximate to each other, on one or more racks for instance), interconnected to one another by a network switching system (e.g., one or more switches or routers). A computer application may then be divided into parts, each of which may be executed on a separate machine of the cluster, and communication between the constituent parts of the application may occur via the switching system.

SUMMARY

When interconnected to a larger computer network such as the Internet, a cluster-based computing environment is ideally situated to function as a host processing platform for third party services. In such an arrangement, the computing environment may be referred to as a "public computing platform," in that it may be made available to host services that are provided by members of the public.

A public computing platform may take various forms and serve various functions. In an exemplary implementation, for instance, a public computing platform may take the form of a cluster-based computing environment for a number of paying customers. In that regard, some of the customers who provide applications for execution on the platform may be competing with each other for business.

The computing platform may be connected to the Internet, via a gateway for instance, and the customers may be providers of Internet services, who are themselves generating revenue from their service (such as by charging end users or advertisers) and paying the provider of the public computing platform to host their services. Further, in an ideal arrangement, a compelling business case will exist for the platform to host many more services than there are physical computers making up the platform.

A public computing platform may therefore generally involve three players: (i) application providers, (ii) the platform provider, and (iii) end users. An application provider is a party who provides an application to be executed on the public computing platform. The application provider may, for instance, provide the platform provider with the set of code (e.g., compiled object code) defining the application in one or more components and may further provide the platform provider with a specification indicating resource requirements (e.g., operating system, memory, bandwidth, inter-component communication, etc.) of the application. There may be many application providers, some of whom may be in competition with each other. In an exemplary arrangement, application providers will pay the platform provider for computational and network resources to be employed in providing their services.

The platform provider, in turn, may own the platform on which the services run. Unlike existing arrangements, a platform provider should ideally be able to concurrently manage many mutually untrusting applications, to provide resource guarantees to the application providers, to bill the application providers accordingly, and to rapidly change application resource allocations if the need arises.

Finally, the end users may be those who use the applications provided by the application providers and run on the platform. For instance, the end users may access platform-based services via the Internet or other communication channel.

The use of a cluster-based computing environment as the public computing platform is advantageous in several respects. For one thing, a cluster-based computing environment may be readily scaled to accommodate growth in the market for services and growth in demand for resources by existing services. For another, since the cluster-based computing environment is made up of a number of computers, the platform can concurrently support a variety of processor instruction sets (e.g., Intel iA32, Sun Microsystems SPARC, Apple Macintosh PowerPC, etc.) and a mixture of operating systems (e.g., Microsoft Windows®, Sun Solaris®, Linux®, etc.) Still further, a robust public computing platform that is embodied in a cluster-based computing environment can omit any middleware layer or other such restrictions, so as to more freely allow the platform to accommodate pre-existing applications (or applications written without regard to the structure of the computing platform) and to help free up processing resources.

Unfortunately, however, a public computing platform structured in this way also suffers from inherent risks as well. For instance, since the platform should be able to support many third party services, not all of which can be equally trusted, a risk exists that one service running on the platform may seek to access or modify another service running on the platform. This is especially the case where applications running on the platform are competing, antagonistic, malicious or roguish (e.g., where the owners of the applications don't trust each other's applications, where the author of one application is intent on malicious destruction of another application or of the platform as a whole, or in some other circumstance). Further, a risk exists that one service may use resources such as CPU time, physical memory, network and disk interface bandwidth, or storage space, for instance) that have been allocated to, required by, and paid for by another service. Consequently, a robust public computing platform should preferably secure the state of each service running on the platform from unauthorized access or modification by other services running on the platform.

In one respect, an exemplary embodiment of the present invention is thus directed to an access control method, or method of managing communications in a computing environment. In accordance with the exemplary embodiment, the computing environment includes a number of interconnected processing nodes on which a number of service components are programmed. As such, the computing environment could take a variety of forms and could serve a variety of functions. For example, and without limitation, the computing environment could take the form of a cluster-based computing environment and could function as a public computing platform.

Within an exemplary computing environment, the processing nodes will be interconnected, via an interconnection system such as a switch or a router. Each node could be an off-the-shelf computer, preferably equipped with a network interface circuit to facilitate coupling with the interconnection system. As such, each node could have a respective network address (e.g., an IP address). The nodes could all be co-located, such as on one or more racks or otherwise under local, common control. Further, at least two of the nodes could run different operating systems and could support different processor instructions sets.

A number of service components will reside in the computing environment. Each service component could be part of an application. And each service component, having a particular identity (i.e., as a particular service component), could be programmed on one or more of the processing nodes and could be associated with a particular port (e.g., a TCP or UDP port) on the node.

The access control method may involve using the identities of the service components as a basis to establish access control-logic that restricts inter-node communications involving one or more of the service components. In turn, the method may involve applying the access-control logic to block an inter-node communication involving the service component(s).

The process of establishing the access-control logic may involve establishing a rule that indicates whether to allow a communication involving the service component(s) and then translating that rule into access-control logic. The communication could be keyed to just one service component, such as a communication to or from that service component, or it could be keyed to multiple service components, such as a communication between two specific service components, programmed on respective nodes.

Inter-node communications between service components could be packet based. Therefore, the process of translating the rule into access-control logic could involve mapping the rule into packet-filter logic keyed to the network addresses/ports at which the service component(s) reside in the computing environment. The packet-filter logic could then be keyed to a combination of a packet transport protocol (e.g., UDP/TCP), a source address in the computing environment and/or a destination address in the computing environment.

In the exemplary embodiment, the access-control logic can be programmed into the interconnection system. As such, the interconnection system could function to detect an attempted inter-node communication, to determine that the communication is not allowed, and to block the communication.

The interconnection system could be provisioned with the access-control logic and could then apply it in practice as attempted communications occur. Alternatively, an entity external to the interconnection system (such as session manager, soft switch, etc.) could be programmed with the access-control logic and could provision the interconnection system on demand. For instance, if the interconnection system signals up to the external entity in response to an attempted communication, the external entity could responsively send the access-control logic to the interconnection system, to be applied. The entity external to the interconnection system may be communicatively linked with the interconnection system.

Still alternatively, the access-control logic could be programmed into such an external entity, instead of or in addition to programming the logic into the interconnection system. If the external entity is made aware of an attempted communication (such as by signaling from the interconnection system), the external entity could itself apply the access-control logic and instruct the interconnection system to block the communication.

In another respect, an exemplary embodiment of the invention may take the form of a method for managing application logic in a public computing platform made up of processing nodes interconnected by an interconnection system. The exemplary method may involve receiving specifications of at least two computer program applications, which cooperatively include a number of application components. The method may then involve loading those components onto at least two of the processing nodes. In turn, the method may involve applying access-control rules that define allowed communications between application components, to restrict inter-node communication between the components.

In still another respect, an exemplary embodiment of the invention may take the form of a computing environment such as that described above. In particular, the computing environment may include an interconnection system, a number of co-located processing nodes interconnected via the interconnection system, and a number of application components loaded onto the processing nodes. Each application component may have a respective access point (e.g., network address/port) within the computing environment. The exemplary computing environment then further includes logic that indicates allowed inter-node communications between application components and that is executable to block restricted communications. The logic could be within the interconnection system or external to the interconnection system.

Further aspects and advantages of the present invention will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF EXEMPLARY EMBODIMENT

1. Exemplary Service Platform Architecture

Figure 1:
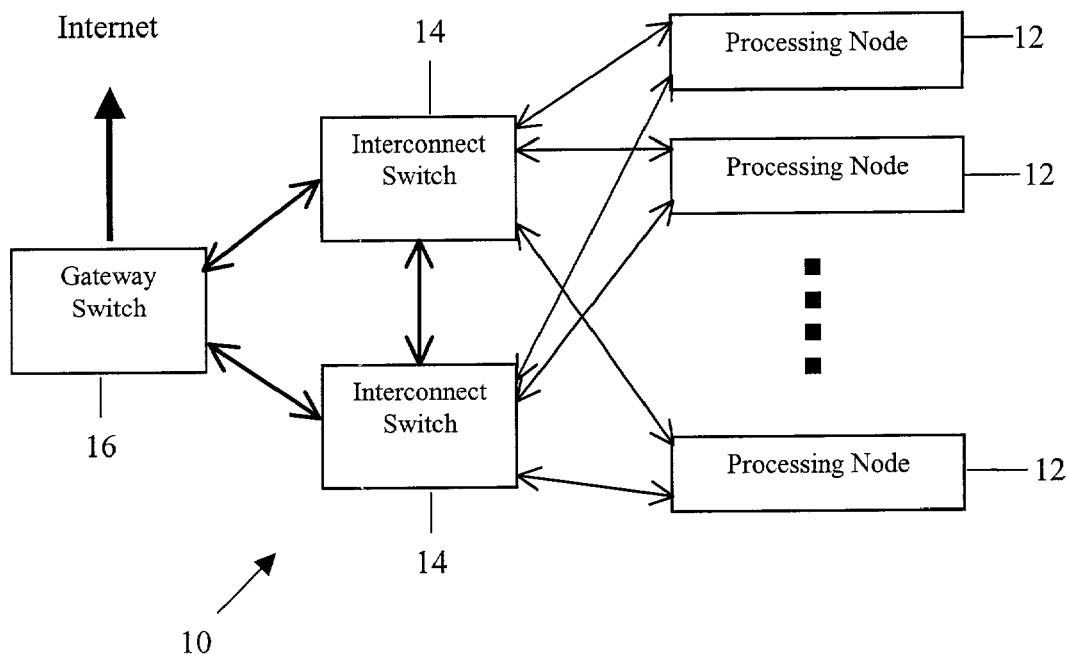
FIG. 1 is a simplified block diagram of a cluster-based computing environment suitable for supporting a public computing platform in accordance with the exemplary embodiment.
Figure 2:
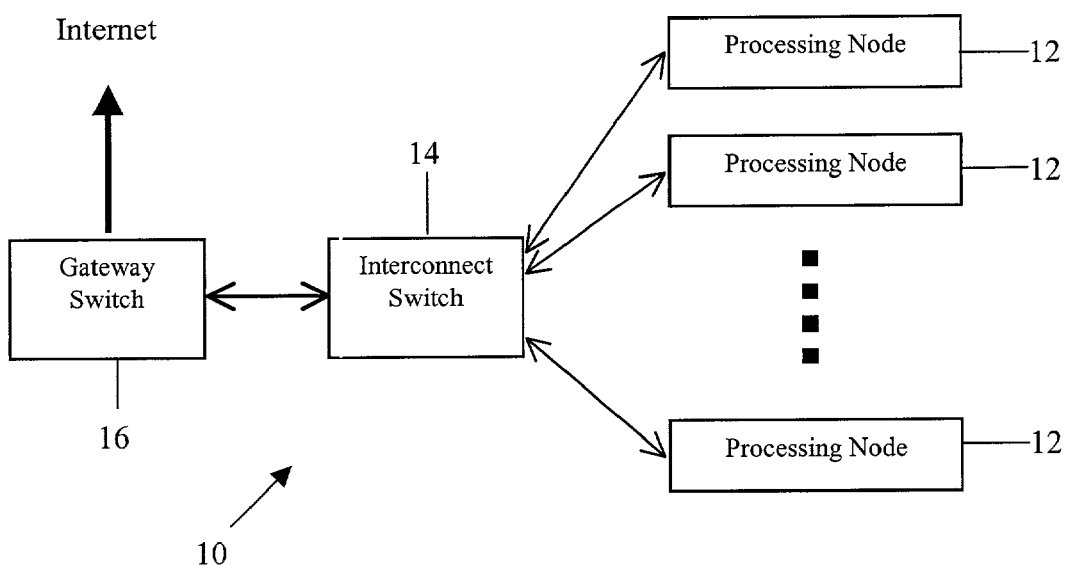
FIG. 2 is another simplified block diagram of a cluster-based computing environment suitable for supporting a public computing platform in accordance with the exemplary embodiment.

Referring to the drawings, FIGS. 1 and 2 illustrate a public computing platform 10 arranged in accordance with an exemplary embodiment of the present invention. As shown in FIG. 1, the exemplary public computing platform may include three types of components, (i) processing nodes 12, (ii) interconnect switches (or routers) 14 and (ii) a gateway switch 16. Of course, it should be understood that this and other descriptions and illustrations provided herein are intended to be only exemplary. Modifications may be made, including the rearrangement, addition and/or omission of components and functions.

Each of the processing nodes 12 may be coupled with each of the interconnect switches 14, and each of the interconnect switches may be coupled with each of the other interconnect switches and with the gateway switch 16. Gateway 16 may then be coupled with (or be part of) another network such as the Internet, for instance. With this arrangement, public computing platform 10 may thus operate as a localized network, in which interconnect switches 14 route communications between the various processing nodes and between the processing nodes and the gateway 16, and gateway 16 routes communications between the public computing platform and entities outside of the public computing platform.

Generally speaking, the processing nodes 12 may be any conventional server computers or other machines on which services may be executed. Each processing node may thus include a processor and an operating system, as well as a data storage medium suitable for holding machine language instructions executable by the processor. Within the platform, the various processing nodes 12 may conveniently have various different processors and operating systems. Alternatively, all of the processing nodes may have the same processors and operating systems as each other.

The interconnect switches 14 may also take various forms. For instance, each interconnect switch may be an IP routing switch, capable of forwarding IP packets at line speed based on information such as IP address (OSI layer 3) and/or UDP or TCP port numbers (OSI layer 4). In the exemplary embodiment, each interconnect switch may be a SmartSwitch Router 8600 (SSR-8600), available from Enterasys Networks of Andover, Mass. Advantageously, the Enterasys switch supports 120 Ethernet/Fast Ethernet ports, 30 Gigabit Ethernet ports, 4 million layer 4 application flows, and 800,000 layer 2 MAC addresses. Further, the Enterasys switch includes a packet-filtering agent capable of providing up to 20,000 security/access filters specified through a provisioning interface. In addition, the Enterasys switch is capable of conventionally serving up to 4,096 virtual local area networks (VLANs) based on port or protocol. Another exemplary interconnect switch is the Alcatel Omnicore 5052 switch, available from Alcatel of Spokane, Wash.

As shown in FIG. 1, more than one interconnect switch may be provided. In this regard, interconnect switching functions may be distributed among more than one interconnect switch, and/or the switches may be redundant to facilitate fault tolerance in the event of a failure of a switch, link, interface card or other component of the computing platform. For many purposes, the exemplary configuration can therefore be implemented and viewed in the simplified manner shown in FIG. 2, albeit with lower fault resiliency.

The gateway may be a layer 3/4 switch capable of routing packet traffic between the platform and an outside network such as the Internet as well as performing a variety of load balancing operations based on layer 7 application data. In the exemplary embodiment, the gateway may be a Content Smart web switch available as Model CSS 11800 from Cisco Systems, Inc. of San Jose, Calif. Like the other components, the gateway router can of course take other forms as well.

The processing nodes may be interconnected by the interconnection system. The interconnection system may detect an attempted inter-node communication and block the attempted inter-node communication. The interconnection system may be communicatively linked with an entity 18 external to the interconnection system. The external entity 18 may be a session manager or a soft switch. The external entity 18 may include access-control logic 19 (e.g., logic that indicates allowed inter-node communication between application components). The external entity 18 may provision an interconnection system on demand. For instance, if the interconnect switch 14 signals to the external entity 18 in response to an attempted communication, the external entity 18 could responsively send the access-control logic 19 to the interconnect switch 14, to be applied.

2. Exemplary Logic Architecture

In the exemplary embodiment, a public computing platform may include a set of services (or, equivalently, "applications") executing on the platform, a control plane for globally managing resources and controlling service execution, and a local resource manager, called a "nucleus," for each node.

a. Services and Capsules

Each service to be executed on the platform may define one or more service components, each of which may be referred to as a "capsule." As an example, a given web-based service could be made up of an application server, a database server and a web server. The application server may be one capsule of the service, the database server may be another capsule, and the web server may be still another capsule.

While some services may run on a single machine (node), many will be distributed in nature, so as to provide fault tolerance and scalability, for instance. Each capsule may thus be loaded onto, and executed by, a respective processing node in the platform, thereby defining the responsibility of that processing node with respect to execution of the service. For instance, with the web-based service described above, the application server could be programmed on one processing node, the database server could be programmed on another processing node, and the web server could be programmed on still another processing node.

Further, to facilitate execution of a given service, the capsule(s) of the service may be allowed to communicate with other capsules (of the given service or of other services) on one or more other nodes via interconnect switch 14. Similarly, to facilitate communication between a given service and an entity outside of the platform, a capsule of the service may communicate with the entity via the interconnect switch 14 and the gateway 16.

Conveniently, the services that are to be executed on platform 10 may be pre-existing services, such as services written without consideration of the platform structure. Examples of such services include (i) a game server, such as a Quake III server, (ii) a web server, such as an Apache server, (iii) a database server, (iv) an e-commerce server, and (v) other server or non-server applications.

In practice, the form of a capsule may vary depending on the operating system running on the capsule's node. For example, a capsule running over Linux® might be a process or process group (along with associated resources containers, quotas, etc.), whereas a capsule running over VMWare might correspond to a virtual kernel. Other examples are possible as well.

b. Nuclei and Node Architecture

Figure 3:
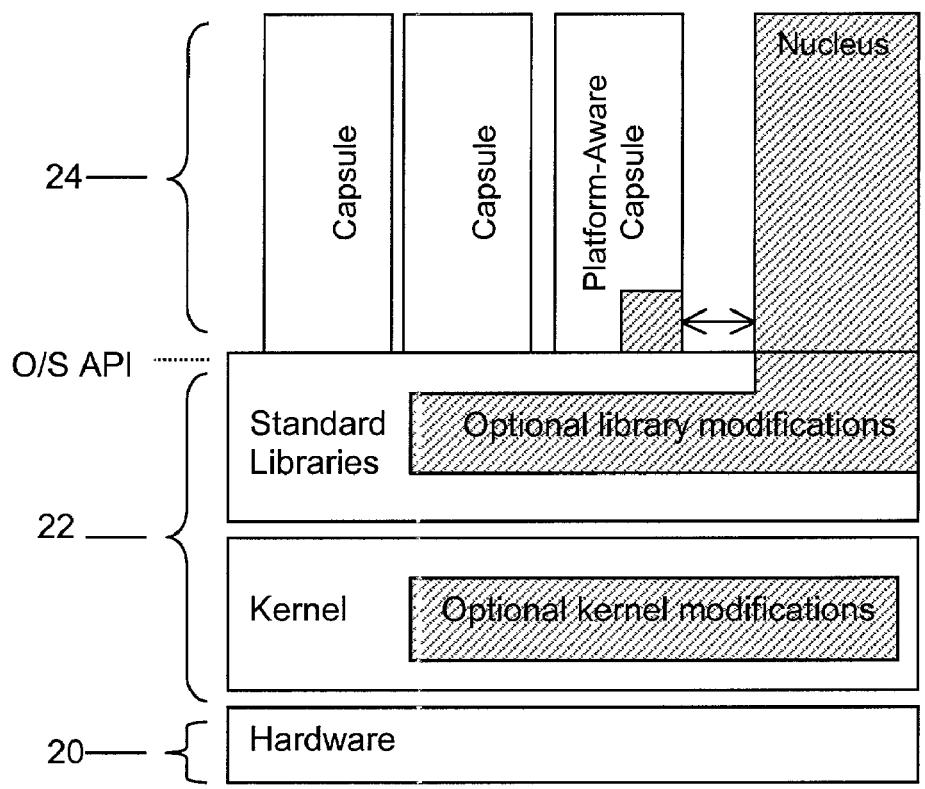
FIG. 3 is a block diagram illustrating the architecture of an exemplary processing node in a public computing platform.

FIG. 3 is a simplified block diagram depicting the architecture of an exemplary processing node 12 in platform 10. As shown in FIG. 3, exemplary node 12 includes a hardware layer 20, an operating system layer 22, and an application layer 24. The hardware layer 20 may include a processor such as an Intel Pentium class processor, data storage media such as a disk drive and memory, and a network interface card to facilitate communications to and from the node. The data storage media may function to store machine language instructions defining the operating system and capsules.

The operating system layer 22 may conventionally define a commodity-based server operating system, such as Windows® 2000, Linux®, Linux® extensions such as QLinux, any of the BSD-derived Unix® systems, or Solaris®. Alternatively, the operating system may be one that offers some virtualization and isolation capabilities, such as VMware, Ensim ServerXChange or Nemesis, for instance. As shown in FIG. 3, the operating system layer may conventionally include a kernel (for interfacing with and managing the hardware layer) and a set of standard operating system modules (such as DLL modules in a Windows® environment), for instance. In the exemplary embodiment, each capsule executes directly over the operating system, without any service platform-mandated middleware layer between the capsule and the operating system.

The application layer 24 may, in turn, define the capsules to be executed on the processing node. FIG. 3 illustrates three capsules of exemplary node 12. However, a given node could have just one capsule or any number of capsules, as desired.

Further, the application layer 24 may also define other executable code, such as code to help manage execution of capsules running on the platform. As noted above, one such set of code may be the nucleus, which may be responsible for starting and stopping execution of capsules on the node in response to commands from a control plane, for monitoring the state of capsules and services, and for reporting status of capsules and of the node to the control plane.

The nucleus may function to map the capsule abstraction to operating system resources such as processes and quotas. For example, the nucleus on a given node may function as an interface between the control plane and capsules on the node, so that the control plane can send instructions to the nucleus without having any particular knowledge about the operating system and/or resource allocations on the node, and the nucleus can take appropriate action in response.

For instance, the control plane may send commands to the nucleus such as "import capsule X", "stop capsule Y", or "change resource allocation to capsule Z". The control plane might not know that a given capsule is a Unix process group, or that a particular resource allocation for a given capsule translates into a set of QLinux shares for CPU, disk and network bandwidth. Rather, the meaning of these concepts may be specific to the node operating system (and, in some cases, to the application itself), so the nucleus may be arranged to implement the concepts.

To facilitate communication between the nucleus and third party applications installed on the node, the nucleus may be arranged to implement facilitates such as those that a human user (e.g., an administrator) would normally invoke to install, start, stop, monitor or otherwise interface with programs on the node. The facilities may be shell or command line instructions to the operating system, for instance, or may take other forms.

In order to enable the control plane to manage capsules running on the platform, scripts in a scripting language such as SafeTcl can be established, defining a set of commands and parameters that each nucleus is arranged to understand and follow. For instance, one command may instruct a nucleus to start a given capsule (specified as a parameter). Another command may instruct a nucleus to stop a given capsule. And still another command may be a polling request, seeking an indication from the nucleus as to the state of a given capsule on the node. This arrangement is similar to use of Unix startup scripts in the /etc/rc.d or /etc/init.d directories (or similar places in other flavors of Unix), where a shell script is provided for each service to stop and start in an orderly and standardized manner when the machine starts up or shuts down, regardless of the particular steps required to control each service.

In this regard, when a new service is loaded onto the platform, the nuclei and/or control plane may be programmed with the identity of the service's capsule(s), so as to be able to manage (e.g., install, run, terminate and monitor) the capsule(s). Further, a configuration script may be established for the service and for its component capsules, so as to allow the control plane to readily deploy the service on the nodes of the platform. (In addition, since many services may share the same implementation (e.g., multiple instances of the Apache server), parameterized instances of ready-made scripts may be established as well.)

Further, the nucleus may function to install extensions to system-wide shared-libraries or other user-space system services, and or kernel extensions if the operating system permits. For instance, a nucleus running on Windows® 2000 might install a Layered Service Provider into the Winsock protocol stack to enforce network interface quality-of-service guarantees to capsules.

As for status reporting, the nucleus could be a fully asynchronous application (which issues no blocking system calls, and uses no synchronous RPCs), arranged to send state reports to an IP multicast group monitored by the control plane. Further, the control plane can communicate with the nucleus in the form of datagrams sent to a well-known UDP unicast port on the node, for instance.

c. Nucleus-Capsule Interface

In order to facilitate management and monitoring of capsules, the nucleus should be arranged to interface with each capsule on the node (e.g., for starting and stopping the capsule and for monitoring capsule health and resource allocations). As noted above, however, a capsule may be a component of a pre-existing service and may be loaded onto a node for execution. Consequently, it is inherently difficult to design a nucleus-capsule interface in advance, before the capsule has been identified or loaded onto a given machine. For example, the set of procedures to shut down a web server might be very different from the set of procedures required to perform a similar action on a multi-user game server.

In the exemplary embodiment, this problem can be solved by specifying the interface to a given capsule procedurally in a scripting language, such as that described above for instance. Preferably, the scripts may comprise the only capsule-specific code in the nucleus and may be loaded on demand (e.g., per instruction from the control plane) when a particular service is deployed on a set of nodes.

The use of small, verifiable scripts in a domain-specific language to express the control and monitoring interface to capsules may allow sufficient express-ability and extensibility to handle most any capsule that is capable of being executed from the command line or a graphical shell, while still retaining a clean separation between the capsule-independent parts of the nucleus, and the capsule-dependent control code. This separation in turn may enable the control plane to deal with an abstraction of capsules without introducing the limitations on capsule implementation inevitable with some kind of advanced "capsule specification."

To facilitate monitoring of capsules and services, a platform-aware capsule on a processing node might send heartbeats to the nucleus of the node. Alternatively, the nucleus may poll the operating system of the node to determine the state of capsules (particularly non-platform-aware capsules) running on the node. The nucleus may then report the state information to the control plane (using the predefined scripting language, for instance), autonomously or in response to a query from the control plane.

d. Control Plane

In the exemplary embodiment, the control plane may function as the analog of an operating system, bearing responsibility for all aspects of managing the platform as a whole. To facilitate this level of control, the control plane may communicate with the nuclei of the various processing nodes. In particular, in the exemplary embodiment, the nuclei may multicast messages to the control plane so as to notify the control plane of events related to node hardware, system software and capsule state, for instance. And the control plane may unicast control messages to specific nuclei, so as to start and stop services, alter resource allocations, and mandate other actions, for instance using a scripting language as described above.

The control plane may be embodied as a software subsystem of the platform (as a service running on the platform). As such, the control plane may be logically centralized. However, in a robust embodiment, the control plane will be implemented as a number of distributed components (as highly trustworthy and highly critical capsules). Some of this distribution is a division of functionality; the use of multicast by the nuclei makes it easy to add new monitoring functionality to the control plane in the form of stand-alone processes that listen to the multicast group. However, the main reason for distributing the control plane is to provide fault tolerance through replication; if a node running the control plane goes down, another replica can take over the system using techniques well known in the field of reliable computing.

Broadly speaking, the control plane can be said to implement policies that then use the mechanisms of the platform hardware and system software. The functionality of the control plane can be divided into a number of areas, including (i) providing an external platform interface, (ii) deployment and monitoring of service, (iii) monitoring nodes and nuclei for failures and (iv) controlling of network elements.

First, the control plane may provide a central point of contact for human operators and external management and accounting systems to interface with the platform. In this regard, the control plane may maintain a picture of platform state, and may be responsible for generating auditing and billing traces, as well as providing an external control interface for its functions.

Second, while the nuclei are aware of capsules and the mapping of capsules onto hardware resources (processes, etc.), it is the control plane that preferably maintains a view of entire services. In particular, the control plane may be responsible for deploying, starting, stopping, and undeploying entire services (rather than simply capsules). Further, in the exemplary embodiment, the control plane may also handle the distributed nature of services and the platform itself, by performing capsule placement so as to distribute both load and risk throughout the platform. (In this regard, for instance, the control plane could quite simply try to place a given capsule on each node until a node is found that matches the resource requirements and other constraints of the capsule; alternatively, the control plane could exhaustively examine every possible combination of capsules and nodes and then pick the "best" combination, according to some metric such as free resources, highest mean level of trust, or the like.) Similarly, the control plane may dynamically handle resource allocation across services and between nodes in the platform.

Third, the control plane may monitor processing nodes and may take action in response to various events. For instance, in response to the failure of a node or nucleus, the control plane may decide to restart the failed node and may send an instruction to the node accordingly. Alternatively, in response to such a failure, the control plane may automatically place onto new (other) nodes the capsules that were running on the failed node.

Fourth, the control plane may also function to provision the gateway 16 and interconnect switches 14 so as to provide access control. In this regard, as services are loaded onto or removed from processing nodes, and as capsules are migrated between nodes (e.g., autonomously in response to a node failure, or in response to user command), the control plane may program the gateway 16 and/or interconnect switches 14 so as to maintain access control within the platform and between the platform and external entities.

In particular, the control plane may send program instructions to the gateway 16 (according to, and via, a provisioning-interface specified by the gateway) to provision the gateway with appropriate network address translation (NAT) and firewalling, so as to direct external traffic to proper services within the platform and to allow only authorized traffic to enter the platform from the outside network (and to help prevent attacks from outside the platform). Further, the control plane may send program instructions to an interconnect switch (according to, and via, a provisioning-interface specified by the interconnect switch) to provision the interconnect switch with packet filtering (e.g., IP packet filters), static routes (e.g., static IP routes) and/or other facilities, so as to restrict inter-node communications between capsules within the platform. As such, the control plane may be considered to function as a session manager, provisioning the interconnect switch before attempted inter-node communications, or in response to attempted inter-node communications.

e. System Services

In addition to including a control plane and nuclei to facilitate management of services running on the platform, the platform may itself provide some system services that may be used in conjunction with other services on the platform. The system services may be provided by the platform provider and may therefore be considered part of the platform.

An example of a system service is a persistent file store, upon which capsules running on the platform may depend. In this regard, for reliability, the platform provider may impose a rule that, while any service can depend on a system service, no system service can depend on an application service (i.e., a service provided by an application provider).

3. Receiving Services

As noted above, an application provider may provide to the platform provider a set of program code that define a service, which the platform provider may then run on behalf of the application provider. In doing so, the application provider may provide a specification indicating the resource requirements and other requirements of the service and its constituent parts.

The application provider may or may not prepare and provide an application as a number of capsules. In the exemplary embodiment, for instance, the division of a given application into a number of capsules may be based upon a variety of factors, such as resource management, security and placement. Based on these or other factors, the application provider and/or platform provider may specify the capsules that define a given application. Each capsule may be loaded onto at least one respective node in the platform to be executed.

4. Protecting Platform Integrity

A robust public computing platform should employ security measures to protect the integrity of the platform itself and the integrity of the services that run on the platform. In this regard, a judgement may be made as to the criticality and trustworthiness of particular aspects of the platform, such as particular services or capsules running on the platform, and a respective scope of protection may be put in place for the various aspects of the platform.

According to the exemplary embodiment, the protection may involve intelligently placing (distributing) capsules within the platform, so as to (i) provide greater protection for more critical capsules and (ii) help safeguard against problems that may be caused by less trustworthy to capsules. Further, the protection may involve imposing restrictions on inter-node communications between capsules, so as to help avoid harmful or disruptive communications between capsules.

a. Types of Platform Failures

To appreciate the concepts of criticality and trustworthiness, it is useful to first understand what types of failures could occur within a public computing platform. As a general matter, failures can be categorized as either (i) platform-level failures, (ii) application-level failures, or (iii) capsule-level failures.

A platform-level failure is a failure of some component of the service platform itself, as opposed to a failure of a third-party service. Examples include the failure of a node, cutting a network link, a failed disk, or a crash of one or more capsules in the control plane or of a system service module. Another example might be a serious breach of trust by a malicious capsule, which may permit the malicious capsule to cause a software failure that stops one or more nodes from operating in accordance with intended procedures, or that consumes excessive resources and thereby prevents the platform from providing required (and perhaps contractually stipulated) resources for another application running on the platform. Still another example may be a serious breach of security, where a malicious capsule gains access to personal, financial, commercial, or other data that is subject to an obligation of confidentiality (e.g., pursuant to a contract between the platform-provider and an application-provider). Platform-level failures are the ones the platform provider needs to worry about most, since they can directly affect the viability of the platform itself.

Platform-level failures may be detected by the infrastructure (hardware, nuclei, control plane and associated platform services) of the platform. As noted above, the control plane performs the monitoring function (with the assistance of the nuclei, for instance.) And the platform provider should as much as possible mask the effects of platform-level failures from both services running on the platform and the end-users of such services, such as by use of redundant links and switches, for instance.

Application-level failure and capsule-level failure, in contrast, are failures of a particular to third party service, where the underlying infrastructure of the platform has played no role in the failure. Further, since the platform preferably functions to insulate a particular application from others, these categories of failures may also exclude failures due to other applications in the system.

The term "application-level failure" is used to describe a third party service failure that is detectable by and visible to the platform. For instance, an application-level failure may be a capsule crashing due to buggy code. A nucleus may detect such an application-level failure by detecting the absence of a heartbeat signal from a capsule, by polling the operating system, or by other means. In response, the nucleus may notify the control plane, and the platform may take some action as a result, such as restarting the capsule in question for instance.

From the perspective of the platform provider, an application-level failure is the application's fault and should not constitute a problem for the integrity of either the platform or other applications. However, the platform provider may offer as a value-added service the ability to restart capsules that have suffered application-level failure.

In contrast, the term "capsule-level failure" is used to describe a third party service failure that is not detectable by and visible to the platform. An example might be a live-locked area of a multithreaded capsule that still reports healthy operation to the nucleus, or corrupt data that does not crash the capsule but causes the capsule to behave in an incorrect, application-specific manner. Since capsule-level failures are not detected by the platform, they should be detected (if at all) within the application.

Responsibility for handling a capsule-level failure lies entirely with the application. The platform (control plane) will not detect the failure, and will only take action in response to a request from the application or something else (such as the application provider phoning the platform provider). Otherwise, the platform clearly cannot take action since it is unaware of the problem. However, in the exemplary embodiment, platform-aware services might be arranged to detect capsule-level failures and to responsively request the platform to take action (such as by killing and then restarting the capsule).

b. Degrees of Risk

In the existing art, computing systems have been characterized as being either totally trusted and bug-free or totally untrusted. Computer science theory and practice has not been able to provide widely applicable or useable mechanisms for proving programs correct. Thus, in general, it is impossible to prove that a program is entirely trustworthy or bugfree. Rather, the current practice is generally to make educated guesses as to whether a given application is trustworthy or not, based on factors such as the reputation of the application provider and legal agreements for instance.

This notion is especially true in the environment of a public computing platform, where third parties may supply most of the applications that run on the platform. The platform provider may never see the sources of a program and may therefore be unable to verify the assertions of the application provider regarding trustworthiness of the program.

In truth, however, an application is usually not totally trustworthy or totally untrustworthy. Rather, an application may more likely trustworthy to some degree individually or in comparison to other applications. Thus, for instance, an application could be characterized as "probably trustworthy" or "likely to be more trustworthy than another application."

Similarly, it is generally not possible to certify that an operating system running on a given node is entirely reliable. Therefore, it is difficult or impossible to assign an absolute rating as to how well an operating system may enforce protection between applications that run on a given node. This is true both for classic security issues—such as malicious attacks by one application module on another (the electronic equivalent of breaking and entering)—and for failure to provide contractually agreed resources. Possibly at best, an operating system, and therefore the node running the operating system, may be characterized as "pretty good" or "better than another operating system."

Further, the consequences of failure to enforce security and resource constraints in a public computing platform are likely to vary greatly. At one end, for instance, failure to protect the control plane could compromise the entire platform. At the other end, for instance, failure to protect certain types of services running on the platform (non-critical services) may simply cause mild annoyance for the end users.

c. Trustworthiness and Criticality

In the exemplary embodiment, to help facilitate a determination of how services should be distributed in the public computing platform, the trustworthiness and criticality of various objects (e.g., capsules, services, nodes, etc.) may be assessed. In this regard, the concepts of trustworthiness and criticality involve matters of judgement, based on business relationships, experience, and other factors. Therefore, it is not possible to define the concepts of trustworthiness and criticality with precision. However, once values are assigned to represent measures of trustworthiness and criticality, the values can then be used to help secure integrity and security in the platform.

(i) Trustworthiness

The concept of trustworthiness of an object is intended to capture the extent to which the platform provider believes it will "behave itself." It is an assessment of the potential threat the object poses to other objects. Such a notion will be different-valued for different classes of object (capsules, applications, nodes, etc.) and is also a multi-dimensional vector, rather than a scalar quantity. For example, dimensions of trustworthiness might include resource usage, memory protection, etc.

The trustworthiness T of a capsule c may be defined as $T_{cap}(c)$. Trustworthiness in this context is how much the platform provider believes that the capsule won't misbehave, such as by doing something unanticipated and undesirable, an example of which might be deliberately corrupting system files. $T_{cap}(c)$ is independent of any node on which the capsule might run, and so really refers to how much the platform provider trusts its code and its owner (this might include notions of fees, penalties, etc.) As such, it may be the kind of notion relevant in a service level agreement. However, in order to reason about the capsule's placement in the platform, the capabilities of the node on which it will be running should also be considered.

Thus, trustworthiness $T_{cap}(c)$ may be modified by the properties of the node on which the capsule is running. In this regard, each node in the platform may have an associated set of protection and isolation capabilities, which might be quite strong (e.g., with Eros, Nemesis, AS/400, Ensim, etc.), quite weak (e.g., with Linux®, NT, etc.) or somewhere in between (eg., with QLinux, etc.). It is therefore possible to define the trustworthiness $T_{run}$ of a particular capsule c when it is running on a node n with a particular set of protection facilities or properties P, as $T_{run}(P,c)$.

Clearly $T_{run}(c)$ is a function of $T_{cap}(c)$. A highly trusted capsule will remain highly trusted regardless of the node on which it is running, but not much more can be said. For instance, a highly untrusted capsule is not necessarily untrustworthy provided it is running on a highly secure node.

$T_{run}$ can be extended to cover a collection of capsules $c_1, \ldots c_r$ all running on the same node, as $T_{run}(P,c_1, \ldots c_r)$. Intuitively, there is a partial order on the values of $T_{run}$. Adding a capsule to a collection on a node should never increase the degree to which the platform provider trusts the collection, since this would imply that the extra capsule exercised some "policing" function, which itself implies a lack of protection between capsules. Hence a platform provider might trust a collection of capsules on the same node no more than the provider trusts any one capsule in the collection (on the node):

$$T_{run}(P,c, \ldots c_r) \leq T_{run}(P,c_i) : \forall i, 1 \leq i \leq r$$

Therefore it is possible to define the trustworthiness of a set of capsules running on a node as a minimum on the partial order:

$$T_{run}(P, c_1, \ldots c_r) = \inf_{1 \leq i \leq r} \{T_{run}(P.c_i)\}$$

Using this trustworthiness measure, it is possible to begin assessing the impact of placing a given capsule c' onto a given node n with functionality P, where the node is already hosting a set of capsules $\{c_i\}$.

(ii) Criticality

The concept of criticality of a capsule is intended to capture how important the platform provider feels a capsule is, or more precisely how worried the platform provider might be about what other capsules might do to a given capsule. A capsule might be highly critical for a number of reasons. For instance, it might be part of the control plane, or it might be owned by a service provider who is paying a premium for a very high degree of availability. The criticality C of a capsule c, C(c), is a property of the capsule itself and is independent of the platform on which it is running. Further, a collective criticality C of a set of capsules $c_1, \ldots c_r$ running on a node can be defined as $C(c_1, \ldots c_r)$.

As with trustworthiness, there is an in intuitive partial order on criticality. Adding a new capsule to a collection of capsules does not make the collection any less critical. However, it may make the collection more critical Thus:

$$C(c_1, \ldots c_r) \geq C(c_i), \forall i, 1 \leq i \leq r$$

Further, as with trustworthiness, we can define the criticality of a collection of capsules running together as:

$$C(c_1, \ldots c_r) = \sup_{1 \leq i \leq r} C(c_i)$$

(iii) Relationship Between Trustworthiness and Criticality

The measures of trustworthiness and criticality of a given capsule can be entirely independent of one another. At the extremes, for instance, a given capsule can be assessed with (i) high trustworthiness and high criticality (e.g., capsules of the control plane), (ii) high trustworthiness and low criticality (e.g., a cut-price pre-packaged static content web server), (iii) low trustworthiness and high criticality (e.g., an application provided by a high-paying customer who is likely to spy on competitors' applications), or (iv) low trustworthiness and low criticality (e.g., arbitrary code written by an unreliable programmer).

Notwithstanding the lack of a relationship between trustworthiness and criticality of a given capsule, the concepts are to some extent duals of one another. In particular, the trustworthiness of a capsule c may indicate how worried a platform provider is about what the capsule may do to other capsules, and the criticality of a capsule may indicate how worried the platform provider is about what other capsules may do to the capsule.

d. Determining Capsule Placement

When a new service is provided to the platform, the capsule(s) of the service should be loaded onto one or more nodes in the platform. Further, when a new capsule is introduced into the platform, or in response to a failure or other event, a platform provider or platform may responsively migrate capsules from one node to another, so as to better distribute the capsules.

The determination of where to place a given capsule in the platform, may be based on a variety of factors. For example, specifications provided by the service provider may dictate at least in part where capsules should be placed. For instance, if the service provider has specified that the application or capsule should be run over a particular operating system, or should be provided with particular node-resources (e.g., storage capacity, bandwidth, etc.), then a determination may be made that the capsule may only be executed on a node that runs the specified operating system and provides the specified node-resources.

In addition, according to the exemplary embodiment, placement of capsules may be advantageously based on measures of trustworthiness and criticality. In this regard, to determine whether to place a particular capsule c on a given node n in the platform, a determination may first be made as to what set of capsules $\{c_i\}$ would be run together on the node. If no other capsules would be run on the node with capsule c, then the set $\{c_i\}$ would consist of only capsule c. If other capsules are already loaded on the node or would be run on the node together with capsule c, then the set $\{c_i\}$ would consist of multiple capsules.

Next, a determination may be made as to whether it would be acceptable to run the set of capsules $\{c_i\}$ on node n with capabilities P. To make this determination, the trustworthiness T and criticality C of the set of capsules $\{c_i\}$ may be assessed and considered. The greater the trustworthiness of the set, the more likely placement of the capsule c in set $\{c_i\}$ on node n is to work in practice. Furthermore, the lesser the criticality of the set, $\{c_i\}$, also the more likely placement of the capsule c in set $\{c_i\}$ on node n is to work in practice.

Consequently, it is possible to define a relation $\supseteq$ between $T_{run}$ and C, and at the same time introduce the co-location rule. This rule provides that it is acceptable to run a mix of capsules $c_1, \ldots c_r$ on a given node with functionality P, if and only if trustworthiness and criticality satisfy the relationship, i.e.:

$$T_{run}(P, c_1, \ldots c_r) \supseteq C(c_1, \ldots c_r)$$

If the values of $T_{run}$ and C are selected from a common set of values, the values can be directly compared. In this regard, the relation $\supseteq$ might become $\geq$, for instance, meaning that the measure of trustworthiness for the given set of capsules running on the node is greater than the criticality of the given set of capsules. However, other relations $\supseteq$ can be defined as well, and even if the trustworthiness and criticality values are not selected from a common set.

Through this analysis, a platform provider or platform (e.g., control plane logic) can conveniently reason as to the placement of a given capsule, based on the trustworthiness and criticality of the capsule. Of course, other manners of assessing and considering trustworthiness and criticality are possible as well.

e. Imposing Communication-Restrictions

Since the capsules of a given service may be placed on separate nodes of the public computing platform, communications between the various capsules may occur via the switching system of the platform, i.e., via one or more interconnect switch. (The communications may be packet-based, in that at at least some point in the communication path, a given communication is embodied in one or more packets, such as TCP/IP or UDP/IP packets for instance.) For instance, in order for a first capsule of an application to call a code routine defined by a second capsule of the application, the first capsule may generate and send a function call to the second capsule, and the function call may be packaged into a datagram (or sequence of datagrams) and sent via the switching system to the other capsule.

In this regard, each node of the public computing platform (i.e., its network interface card) may sit at a designated physical location in the platform and may have an associated network address. For instance, each node may have a respective IP address. In turn, each capsule running on a given node may be associated with a respective transport port (e.g., TCP port or UDP port) of the node. Consequently, a communication destined for a given capsule on a given node can be sent to the IP address of the node and the transport port of the capsule. As is known in the art, the term "service-access-point" (SAP) can conventionally be used to describe a network location such as an IP address, or a combination IP address and port number, for instance.

Communication should be allowed to occur between the capsules of a given service, and in some cases between the capsule of one service and the capsule of another service (such as between a third party application and a data storage service provided by the platform). However, it may be best to disallow other inter-node communications between capsules, or particular inter-node communications between capsules. Without restrictions on such communication, a capsule on one node could intentionally or unintentionally harm a capsule on another node, or could harm the other node itself. A risk of such harm is particularly acute between antagonistic services (capsules), such as services owned by separate service providers who compete for business (e.g., having one common customer or potential common customer), for instance.

According to the exemplary embodiment, restrictions on inter-node communications between capsules (i.e., inter-node communications to a capsule and/or from a capsule) are imposed by a process that may involve first establishing a set of rules representing allowed communications between capsules and then mapping the rules onto logic in the public computing platform. In turn, in response to an attempted inter-node communication between capsules, the logic can determine whether the communication is allowed. If the determination is that the communication is not allowed, then the logic can block the communication.

(i) Deriving Access Control Lists

Access Control Lists (ACLs) may be used to express allowed communications between capsules in the public computing platform. In the exemplary embodiment, an ACL sets forth an intermediate representation indicating allowed communications between capsules. Thus, each rule in an ACL might specify the communicating capsules and a direction of communication between the capsules, if appropriate. At any time, the list of ACL rules may be generated based on the current state of the platform, including which services are active in the platform, what their capsules' communication requirements are, and where the capsules are currently placed in the platform.

Figure 4:
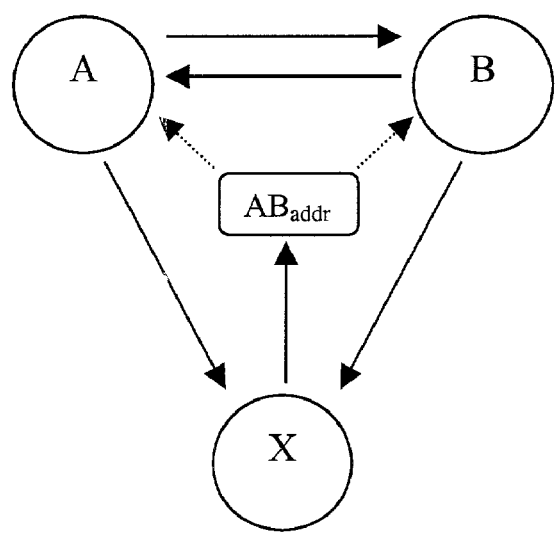
FIG. 4 is a sample communication flow diagram depicting allowed communication between application components in an exemplary public computing platform.

FIG. 4 depicts an example communication pattern, which may be represented as an ACL. Referring to FIG. 4, three capsules are shown, capsule A, capsule B, and capsule X. As shown, bi-directional communication is allowed between capsules A and B, and both of these capsules can send communications to X. However X can contact A or B only through the multicast address $AB_{addr}$. This example situation may occur, for instance, where A and B are capsules of the control plane, and X represents an untrusted nucleus capsule.

Assuming these are the only rules for the platform, the ACL needed to enforce the situation shown in FIG. 4 may be as follows:

allow source A to destination B
allow source B to destination A
allow source A to destination X
allow source B to destination X
allow source X to destination $AB_{addr}$
deny all other communication While this set of ACL rules is relatively simple, it should be understood that a given set of ACL rules could vary in complexity. For instance, an ACL rule could be a multi-part Boolean expression, indicating allowed inter-node communications between capsules, and could involve far more parameters than just a source capsule and/or destination capsule. As an example, if communications are to be restricted based on time or date, then an ACL rule may incorporate a time or date parameter as well. Further, communications may be restricted based on level of service or other parameters.

(ii) Mapping an ACL to the Platform

In the exemplary embodiment, the ACL is a hardware-independent representation of allowable inter-node communications between capsules. Once the ACL is established, the rules may then be mapped to a set of logic (hardware, software and/or firmware) within the platform, which may then function to distinguish per-capsule traffic and to enforce the rules in practice.

The logic employed to enforce communication restrictions may take various forms, as can the mechanism used to provision the logic with the rules to be enforced. Examples of suitable logic include, but are not limited to, the following:

(A) PACKET-FILTER LOGIC WITHIN AN INTERCONNECT SWITCH.

A packet-switch, such as the Enterasys SSR-8600 for instance, may provide a set of programmable port filters (e.g., layer 3 or 4 filters), which may be collectively referred to as a packet-filtering agent. The switch will also typically provide a provisioning-interface including a command line through which an administrator or other machine can provide predetermined commands representative of filters to be enforced by the packet-filtering agent. In the exemplary embodiment, the ACL rules can be translated into the appropriate commands and input to the switch, so as to provision the packet-filtering agent.

(B) STATIC-ROUTING WITHIN AN INTERCONNECT SWITCH.

A packet-switch may allow static routes to be established. Thus, for instance, an interconnect switch may be programmed to automatically route to a specified SAP in the public computing platform any communication that originates from a particular SAP. The switch may also provide a provisioning-interface through which commands may be entered to set up such static routes.

(C) VLAN RESTRICTIONS WITHIN AN INTERCONNECT SWITCH

A packet-switch, such as the Enterasys SSR-8600 for instance, may implement Virtual LANs (VLANs), per IEEE standard 802.1P/Q. If so, then the ACLs can be used to set up VLANs between nodes and/or capsules in the platform. Only nodes connected via a VLAN would be able to communicate. In particular, the switch may distinguish between a number of virtual local area networks (VLANs), each identified by VLAN tags carried by packet traffic. Again, the switch may provide a provisioning-interface through which commands may be entered to set up VLAN logic.

(D) FIREWALL LOGIC OF A NODE

A node may provide firewall security, which may conventionally allow only certain specified traffic to enter the node. The firewall may take the form of software, firmware or hardware logic executed by the node or a component (e.g., network interface unit) associated with the node. The firewall may be set up to allow only the packet communications to the node that the ACL indicates are allowable. The node may provide a provisioning-interface through which commands may be entered to set up the firewall logic.

All of these mechanisms, including filtering in the interconnect switch, can be combined to implement filtering mechanism in systems where hardware constraints (such as limits on the number of filtering rules supported by the interconnect switch) preclude a single implementation approach.

In the exemplary embodiment, the control plane can be arranged to provide a user interface through which a user (e.g., an administrator of the platform) can enter and/or edit a set of ACL rules, with graphic or textual representations for instance. Alternatively, the control plane may receive specifications for new services and may automatically generate ACL rules, based on the specifications. The control plane may then be arranged to automatically send appropriate commands to one or more provisioning-interfaces within the platform so as to set up the logic suitable for enforcing the ACL rules. For instance, presented with a given set of ACL rules, the control plane may send a set of commands to an interconnect switch so as to set up the packet-filtering agent of the switch, and the control plane may send another set of commands to one or more nodes in the platform so as to set up firewall logic in the nodes. The control plane may further be arranged to pick the best (e.g., most efficient) set(s) of logic to carry out particular communication restrictions.

This process of mapping ACL rules to logic within the platform may, to some extent, be an approximation. For instance, if the packet-filtering agent of an interconnect switch is filled to capacity and unable to support any further communication restrictions, and if no other filtering logic is available, some compromise might need to be made; a judgement may be made that some ACL rules are less important than others and can therefore be set aside in favor of the others. In that instance, notions of trustworthiness and criticality may re-enter the process.

For example, communications from highly trusted capsule are less apt to cause problems, so ACL rules for such communications may be set aside in favor of other more important rules. On the other hand, communications to a highly critical capsule may be more viewed as more sensitive, so ACL rules for such communications should preferably be maintained, while other rules may be set aside if possible. Other examples are possible as well.

(iii) Blocking Disallowed Traffic

Once the logic is in place in the platform, the logic can conveniently be employed to block attempted traffic that is not authorized. For instance, when a capsule on a first node in the platform attempts to send a communication to a capsule on a second node in the platform, the packet-filtering agent on the interconnect switch may receive the attempted communication in the form of a packet made up of data (header and/or payload) representing information such as source SAP, destination SAP, service level (e.g., QOS or TOS) or other information. The packet-filtering agent may then compare the data to a stored data structure maintained by the switch and thereby determine that the attempted communication is in fact not allowed. Consequently, the packet-filtering agent may simply drop the packet (i.e., not route it).

Further, in the exemplary embodiment, the logic may be programmed to take or facilitate remedial action in response to one or more blocked communications. For instance, the logic may be arranged to log blocked traffic and to send an alert message to the control plane and/or to another entity whenever more than a threshold number of blocked communications (e.g., more than a predetermined number of blocked communications originating from a given capsule) has occurred. In response, the control plane may automatically terminate the offending capsule. In this regard, policing functions can be based on token bucket schemes, which are well known to those of ordinary skill in the networking art.

(iv) Example of Communication Control

Consider a small service platform composed of three processing nodes with addresses A, B, and C, together with a gateway router. Let M be the multicast address used to communicate with the control plane, P to be the subnet used for addressing within the platform (so that A, B, and C are all on the subnet P) and I to be the external Internet (i.e., every address except the P subnet and the multicast address range).

Suppose that the platform runs three services:

The Control Plane itself. This consists of a single capsule on node C, listening on UDP port 14568 to multicast messages sent to the group with IP address M. It unicasts UDP messages back to nuclei on nodes A, B, and C to port 14568. Since the control plane is highly critical, it is the only capsule on node C.

A Web Server. This consists of a single capsule which accepts TCP connections from outside the platform to port 80 on node A.

A replicated LDAP server. This consists of two capsules (a master server and a replication slave). The master runs on node B, whereas the slave (which is less critical) shares node A with the Web server. Both capsules accept TCP connections from outside to port 389, and also communicate with each other by opening TCP connections to port 389.

The following list of ACL rules may represent the allowable communication in such a system, where I denotes any IP address outside the cluster, i.e. outside the subnet of A, B and C and outside the multicast address range:

Allow UDP source (P, *) destination (M, 14568)
Allow UDP source (C, *) destination (P, 14568)
Allow TCP source (I, *) destination (A, 80)
Allow TCP source (I, *) destination (A, 389)
Allow TCP source (I, *) destination (B, 389)
Allow TCP source (A, *) destination (B, 389)
Allow TCP source (B, *) destination (A, 389)
Deny all other A switch like the Enterasys SSR-8600 may implement filter lists which are then applied to sets of ports on the switch. Each filter list consists of a series of match expressions associated with actions (allow or deny), which are evaluated in order. The first expression to match triggers the associated action and terminates the filter. The default, fall-through behavior of the switch is to allow is to discard the packet.

The situation in this example requires four filter lists, one for each port. These filters are as follows, starting with the switch port corresponding to node A (the LDAP master capsule):

Allow UDP source (A, *) destination (M, 14568)
Allow TCP source (A, *) destination (B, 389)
Allow TCP source (A, 389) destination (I, *)
Allow TCP source (A, 389) destination (B, *)

This filter list ensures that packets originating at node A have the correct source address (A). A can make TCP connections to the LDAP port on B, can multicast nucleus messages to the control plane, and can send packets from its own LDAP port to B and the Internet (for LDAP connections set up to it).

Node B runs the web server and the LDAP slave:

Allow TCP source (B, 80) destination (I, *)
Allow UDP source (B, *) destination (M, 14568)
Allow TCP source (B, *) destination (A, 389)
Allow TCP source (B, 389) destination (I, *)
Allow TCP source (B, 389) destination (A, *)

This is a lot like A, except that the web server can also respond to connections to port 80.

Node C runs the control plane; it only needs to be able to unicast to any node in the platform:

Allow UDP source (C, *) destination (P, 14568)

In practice, node C would also be allowed to multicast to the control plane group to permit other control plane components to be added to the mix later, so the complete filter list should look like:

Allow UDP source (C, *) destination (P, 14568)
Allow UDP source (C, *) destination (M, 14568)

Finally, the gateway G filters incoming packets from the Internet:

Allow TCP source (I, *) destination (B, 80)
Allow TCP source (I, *) destination (A, 389)
Allow TCP source (I, *) destination (B, 389)

As the foregoing illustrates, the number of filters required on the interconnect switch port corresponding to the gateway in the example above increases with the number of service capsules in the system, while the number of filters required on interconnect switch ports corresponding to processing nodes only increases with the number of capsules on that node.

This represents a potential bottleneck for the interconnect switch(s), but fortunately this is not an issue: the filters can be safely offloaded to the gateway content switch. Such switches typically have a far greater number of possible filters, provided that the switch is used with definite "inside" and "outside" networks, as is the case here. In this scenario, the filters on the interconnect switch port used by the gateway would simply prevent external spoofing of source addresses within the platform:

Allow UDP source (G, *) destination (C, 14568)
Deny TCP source (P, *)
Deny UDP source (P, *)

Typically such a switch would also implement a full variety of ACL and NAT functions.

5. Conclusion

An exemplary embodiment of the present invention has been illustrated and described. It will be understood, however, that changes and modifications may be made to the invention as described without deviating from the spirit and scope of the invention, as defined by the following claims.

We claim:

1. A method of managing communications between service components in a computing environment, the computing environment comprising an interconnection system, an entity external to the interconnection system and communicatively linked with the interconnection system, and a plurality of processing nodes interconnected by the interconnection system, each of the service components having a respective identity, the method comprising:
   assigning to each service component a respective trustworthiness measure and a respective criticality measure;
   for each service component, using the trustworthiness and criticality measures assigned to the service component so as to determine one or more of the processing nodes onto which the service component should be programmed;
   programming each service component onto the one or more processing nodes determined to be the one or more processing nodes onto which the service component should be programmed;
   based on the identity of at least one of the service components, establishing access-control logic restricting inter-node communication involving the at least one service component;
   programming the external entity with the access-control logic;
   at the external entity, receiving from the interconnection system a signal indicating detection of an attempted inter-node communication involving the at least one service component;
   in response to receiving the signal, the external entity providing at least a portion of the access-control logic to the interconnection system; and
   applying the access-control logic provided to the interconnection system, to block the attempted inter-node communication involving the at least one service component,
   wherein the trustworthiness measure for each service component represents an assessment of a potential threat the service component poses to other objects, and
   wherein the criticality measure for each service component represents a measure of concern for what the other objects may do to the service component.

2. The method of claim 1, wherein establishing the access-control logic comprises:

establishing a rule indicating whether to allow a communication involving the at least one service component; and
translating the rule into the access-control logic.

3. The method of claim 2, wherein:
establishing a rule indicating whether to allow a communication involving the at least one service component comprises establishing a rule indicating whether to allow a communication with a first service component programmed on a first processing node in the computing environment.

4. The method of claim 3, wherein:
establishing a rule indicating whether to allow a communication involving the at least one service component comprises establishing a rule indicating whether to allow a communication between (i) a first service component programmed on a first processing node in the computing environment and (ii) a second service component programmed on a second processing node in the computing environment.

5. The method of claim 3, wherein the at least one service component resides at at least one service-access-point in the computing environment, and wherein translating the rule into the access-control logic comprises mapping the rule into packet-filter logic associated with the at least one service-access-point.

6. The method of claim 5, wherein the at least one service-access-point comprises an IP address of the first processing node.

7. The method of claim 6, wherein the first processing node is programmed to associate a first transport port with the first service component, and wherein the at least one service-access-point further comprises the first transport port.

8. The method of claim 1, wherein applying the access-control logic to block an inter-node communication involving the at least one service component comprises:
   detecting an attempted inter-node communication involving the at least one service component;
   based on the access-control logic, making a determination that the attempted inter-node communication should be blocked; and
   in response to the determination, blocking the attempted inter-node communication.

9. The method of claim 1, wherein at least two processing nodes of the plurality of interconnected processing nodes run different operating systems.

10. The method of claim 1, wherein at least two processing nodes of the plurality of interconnected processing nodes support different processor instructions sets.

11. The method of claim 1, wherein the computing environment is a cluster-based computing environment.

12. The method of claim 1, wherein the computing environment is a public computing platform.

13. A method of managing communications between service components in a computing environment, the computing environment comprising an interconnection system, an entity external to the interconnection system and communicatively linked with the interconnection system, and a plurality of processing nodes interconnected by the interconnection system, each of the service components having a respective identity, the method comprising:
   assigning to each service component a respective trustworthiness measure and a respective criticality measure;
   for each service component, using the trustworthiness and criticality measures assigned to the service component so as to determine one or more of the processing nodes onto which the service component should be programmed;

programming each service component onto the one or more processing nodes determined to be the one or more processing nodes onto which the service component should be programmed;

based on the identity of at least one of the service components, establishing at least one access-control rule indicating whether to allow at least one communication involving the at least one service component;

translating the at least one access-control rule into access-control logic;

programming the external entity with the access-control logic;

at the interconnection system, detecting an attempted inter-node communication between service components and responsively sending the external entity a signal indicating detection of the attempted inter-node communication;

at the external entity, receiving the signal indicating detection of the attempted inter-node communication and responsively providing at least a portion of the access-control logic to the interconnection system;

based on the access-control logic provided to the interconnection system, determining that the attempted inter-node communication between service components is not allowed; and responsively blocking the attempted inter-node communication, wherein the trustworthiness measure for each service component represents an assessment of a potential threat the service component poses to other objects, and wherein the criticality measure for each service component represents a measure of concern for what the other objects may do to the service component.

14. The method of claim 13, wherein the access-control logic comprises packet-filter logic.

15. The method of claim 13, wherein:

each of the service components is designated by a respective service-access-point (SAP) in the computing environment, and each processing node has a respective SAP as well; and the access-control logic comprises packet-filter logic associated with at least one SAP in the computing environment.

16. The method of claim 15, wherein the respective SAP of each service component comprises an IP address of the respective processing node on which the service component is programmed, and wherein the access-control logic comprises packet-filter logic associated with at least one such IP address.

17. The method of claim 16, wherein at least one of the SAPs of a service component further comprises a port selected from the group consisting of a TCP port and a UDP port, and wherein the packet-filter logic is further associated with at least one such port.

18. The method of claim 13, wherein the communications between service components are packet-based; and wherein the access-control logic comprises packet-filter logic associated with a combination of at least (i) a packet transport protocol, (ii) a source address in the computing environment and (iii) a destination address in the computing environment.

19. The method of claim 13, wherein translating the at least one access-control rule into access-control logic comprises:

mapping the at least one access-control rule to packet-filter logic associated with at least one service-access-point in the computing environment.

20. The method of claim 13, wherein at least a given one of the processing nodes includes a firewall for restricting communications with the given processing node; and translating the at least one access-control rule into access-control logic comprises provisioning the firewall of the given processing node to allow communications between at least one service component programmed on the given processing node and at least one service component programmed on another processing node.

21. The method of claim 13, wherein the interconnection system further performs the element of blocking the attempted inter-node communication.

22. The method of claim 13, further comprising:

providing at least another portion of the access-control logic to the interconnection system prior to detecting the attempted inter-node communication between service components.

23. The method of claim 13, wherein the interconnection system comprises a switch, and wherein providing the at least a portion of the access-control logic to the interconnection system comprises setting up the switch to apply the access-control logic.

24. The method of claim 23, wherein the switch comprises (i) a packet-filtering agent and (ii) a provisioning-interface for receiving command-line instructions to set up the packet-filtering agent, the switch being arranged to translate the command-line instructions into packet-filtering logic executable by the packet-filtering agent; and wherein setting up the switch to apply the access-control logic comprises providing the switch, via the provisioning-interface, with command-line instructions representative of the access-control logic.

25. The method of claim 21, wherein an entity coupled to the interconnection system performs the element of providing at least a portion of the access-control logic to the interconnection system.

26. The method of claim 25, wherein the external entity coupled to the interconnection system comprises a session manager.

27. The method of claim 21, wherein the interconnection system comprises a switch.

28. The method of claim 21, wherein the interconnection system comprises a router.

29. The method of claim 13, wherein the computing environment is a cluster-based computing environment.

30. The method of claim 13, wherein the computing environment is a public computing platform.

31. The method of claim 13, wherein the attempted inter-node communication comprises an attempted inter-node communication between antagonistic service components.

32. The method of claim 13, wherein the attempted inter-node communication comprises an attempted communication of a packet from a first processing node to a second processing node, and wherein blocking the attempted communication comprises dropping the packet.

33. A method for managing application logic in a public computing platform, the public computing platform comprising (i) a network of processing nodes interconnected by an interconnection system, and (ii) an entity external to the interconnection system and communicatively linked with the interconnection system, the method comprising:

receiving specifications of at least two computer-program applications, the applications cooperatively comprising a number of application components;

assigning to each application component a respective trustworthiness measure and a respective criticality measure;

for each application component, using the trustworthiness and criticality measures of the application component so as to determine one or more of the processing nodes onto which the application component should be programmed;

programming each application component onto the one or more processing nodes determined to be the one or more processing nodes onto which the application component should be programmed;

at the interconnection system, detecting an attempted inter-node communication between the application components and responsively sending to the external entity a signal indicating detection of the attempted inter-node communication;

at the external entity, receiving the signal indicating detection of the attempted inter-node communication and responsively providing to the interconnection system at least a portion of access-control rules that define allowed communications between the application components; and applying the access-control rules provided to the interconnection system, to block the attempted inter-node communication between the application components, wherein the trustworthiness measure for each application component represents an assessment of a potential threat the application component poses to other objects, and wherein the criticality measure for each application component represents a measure of concern for what the other objects may do to the application component.

34. A computing environment with communication control comprising:

an interconnection system;

a plurality of co-located processing nodes interconnected via the interconnection system;

a plurality of application components, each of the application components being assigned a respective trustworthiness measure and a respective criticality measure, wherein for each application component, the trustworthiness and criticality measures assigned to the application component are used to determine one or more processing nodes onto which the application component should be loaded, each of the application components being loaded onto the one or more the processing nodes determined to be the one or more processing nodes onto which the application component should be loaded, each of the application components having a respective service-access-point defining a location of the application component in the computing environment; and an entity, external to the interconnection system, communicatively linked with the interconnection system, wherein the external entity includes access-control logic indicating allowed inter-node communications between application components, wherein the interconnection system detects an attempted inter-node communication between application components and responsively sends to the external entity a signal indicating detection of the attempted inter-node communication, wherein the external entity receives the signal and responsively provides the access-control logic to the interconnection system, the access-control logic being executable, in response to the attempted inter-node communication, to make a determination of whether the attempted inter-node communication is allowed; and the access-control logic being executable, in response to a determination that the attempted inter-node communication is not allowed, to block the attempted inter-node communication wherein the trustworthiness measure for each application component represents an assessment of a potential threat the application component poses to other objects, and wherein the criticality measure for each application component represents a measure of concern for what the other objects may do to the application component.

35. The computing environment of claim 34, wherein the computing environment is a cluster-based computing environment.

36. The computing environment of claim 34, wherein the computing environment is a public-computing platform.

37. The method of claim 34, wherein at least two of the co-located processing nodes run different operating systems.

38. The method of claim 34, wherein at least two of the co-located processing nodes support different processor instructions sets.

39. The method of claim 1, further comprising:

using the access-control logic to block a number of attempted inter-node communications involving the at least one service component, wherein the attempted inter-node communication originates from a given service component;

using the access-control logic to log the number of blocked attempted inter-node communications involving the at least one service component and originating from the given service component, and after a threshold number of attempted inter-node communications involving the at least one service component and originating from the given service component have been blocked, using the access-control logic to send an alert message to the external entity, wherein in response to the alert message, the external entity terminates the given service component.

40. The method of claim 39, wherein the threshold number of attempted inter-node communications involving the at least one service component have been blocked is greater than or equal to one.

* * * * *